United States Patent
Santhanam (10) Patent No.: US 8,250,541 B2
(45) Date of Patent: Aug. 21, 2012

(54) REVERSIBLE OBJECT CODE COMPILER FOR MATHEMATICAL MODELS

(75) Inventor: Viswanathan Santhanam, Bothell, WA (US)

(73) Assignee: The Boeing Company, Chicago, IL (US)

(*) Notice: Subject to any disclaimer, the term of this patent is extended or adjusted under 35 U.S.C. 154(b) by 1370 days.

(21) Appl. No.: 11/858,719

(22) Filed: Sep. 20, 2007

(65) Prior Publication Data

US 2009/0083699 A1    Mar. 26, 2009

(51) Int. Cl.
*G06F 9/44* (2006.01)

(52) U.S. Cl. .................................................... 717/126

(58) Field of Classification Search .................. 717/104, 717/114, 136, 145, 126; 703/6, 14, 22; 716/103–104; 707/708
See application file for complete search history.

(56) References Cited

U.S. PATENT DOCUMENTS

| | | | |
|---|---|---|---|
| 5,210,837 A | 5/1993 | Wiecek | |
| 5,881,290 A | 3/1999 | Ansari et al. | |
| 5,978,580 A | 11/1999 | Wang et al. | |
| 6,151,701 A | 11/2000 | Humphreys et al. | |
| 6,219,660 B1 | 4/2001 | Haderle et al. | |
| 6,279,150 B1 | 8/2001 | Bachmann | |
| 6,321,235 B1 | 11/2001 | Bird | |
| 6,453,313 B1 | 9/2002 | Klein et al. | |
| 6,604,102 B2 | 8/2003 | Klein et al. | |
| 6,615,214 B1 | 9/2003 | Bird et al. | |
| 6,654,754 B1 | 11/2003 | Knauft et al. | |
| 6,981,217 B1 | 12/2005 | Knauft et al. | |
| 7,051,322 B2 | 5/2006 | Rioux | |
| 7,062,707 B1 | 6/2006 | Knauft et al. | |
| 7,096,216 B2 | 8/2006 | Anonsen | |
| 7,131,077 B1 * | 10/2006 | James-Roxby et al. | 716/103 |
| 7,720,656 B2 * | 5/2010 | Raghavan et al. | 703/6 |
| 7,813,912 B1 * | 10/2010 | Sundararajan | 703/22 |
| 2003/0167423 A1 | 9/2003 | Murakami et al. | |
| 2005/0055678 A1 * | 3/2005 | Sakai | 717/136 |
| 2007/0067755 A1 | 3/2007 | Hinchey et al. | |
| 2007/0074180 A1 | 3/2007 | Hinchey et al. | |

OTHER PUBLICATIONS

Joshua M. Olson, "Modeling of a Discrete even manufacturing plant and design and implementation of controller using Labview and programmable logic controller", Thesis, copyright 2005, 148 pgs <Modeling_LabVw_05.pdf>.*

* cited by examiner

*Primary Examiner* — Tuan A Vu (74) *Attorney, Agent, or Firm* — Armstrong Teasdale LLP (57) ABSTRACT

A method for verifying a software implementation generated from a model that includes a plurality of model elements is described. The method includes converting a model description into a textual representation of model elements and interconnections between the model elements, defining a series of assembler macros that implement the functionality of the model elements as sequences of assembly instructions for a target processor, compiling the textual representation into an object code image associated with a target processor using the macros, describing the object code image in a context-free grammar, and reproducing the model description from the object code image and the context-free grammar.

17 Claims, 3 Drawing Sheets

Figure 3

REVERSIBLE OBJECT CODE COMPILER FOR MATHEMATICAL MODELS

STATEMENT REGARDING FEDERALLY SPONSORED RESEARCH & DEVELOPMENT

The United States Government has acquired certain rights in this invention pursuant to Contract No. NAS4-00041, issued by the National Aeronautics and Space Administration.

BACKGROUND OF THE INVENTION

This invention relates generally to auto-coding software, and more specifically, to a reversible object code compiler for mathematical models.

Currently, the mapping between software object code and models is verified through manual review and a significant amount of analyses of the object code, the auto-code tool that generates the source code, and the compiler that generates the object code from the source code. There are three popular modeling packages that are currently available. MATLAB, the most popular software includes a C code auto-code tool called Real-Time Workshop. MATRIXx pre-dates MATLAB and includes a tool called Autocoder which can generate C source code or Ada source code from the models. SCADE is another product with similar capabilities. All three are relevant examples of the current state of auto-coding.

Control systems are often designed and validated using mathematical modeling packages such as those mentioned above. In recent years, it has become commonplace to automatically generate a software implementation of the model in a high-order language, such as C, using an auto-coder tool included in the modeling package. Typically the auto generated code (auto-code for short) preserves sufficient structure of the model to be able to map elements of the source code to the corresponding elements of the model, which could be used to reconstruct the model from the auto-code. However, it is virtually impossible to do the same after the source code has been compiled, linked and loaded as an executable image in the memory of the target computer. An ability to reconstruct a model from the executable object would enable verification that the executable object code does implement the model faithfully. Such evidence is often required of safety-critical software, and that evidence is presently constructed through labor-intensive testing and analyses.

BRIEF DESCRIPTION OF THE INVENTION

In one aspect, a method for verifying a software implementation generated from a model that includes a plurality of model elements is provided. The provided method includes converting a model description into a textual representation of model elements and interconnections between the model elements, defining a series of assembler macros that implement the functionality of the model elements as sequences of assembly instructions for a target processor, compiling the textual representation into an object code image using the macros, describing the object code image in a context-free grammar, and reproducing the model description from the object code image and the context-free grammar.

In another aspect, a system configured for verification of software implementations that are generated from models is provided where the models include one or more model elements. The system includes an extractor tool configured to utilize a graphical representation of a model to produce a textual representation of the model, including model elements and interconnections between model elements, a forward compiler configured to implement the representation of the model as an object code image, a context-free grammar describing the object code image, and a reverse complier tool configured to reproduce the model from the grammatical description and the object code image.

In still another aspect, a method for producing executable object code from a model description is provided. The method includes converting a model description into a textual representation of model elements and interconnections between the model elements, and utilizing a library of macros as building blocks to generate an object code image of the model description, from the textual description, the macros including templates of object code.

In yet another aspect, a method for reproducing a description for a model from an executable object code image is provided. The method includes describing the object code image in a context-free grammar, and reproducing the model description from the object code image and the context-free grammar, based on a library of macros utilized in the generation of the object code image.

DETAILED DESCRIPTION OF THE INVENTION

Herein described is a model-to-object compiler that compiles a model into object code and another compiler that reconstructs the original model from the object code. Such a system is referred to in entirety as MORC, which is an acronym for model-to-object reversible compiler. Processes and tools associated with a MORC system are operable to generate software object code from mathematical models such that the object code, configured for loading onto a target processor, can be reversed back into the model diagrams from which it was generated. In one specific application, the processes and associated tools lead to a reduction in the verification cost of safety-critical airborne software by providing evidence that the software exactly represents the model. The processes do not generate source code, as is done in current auto-coding solutions, but instead translate models directly into the object code of the target computer. The generated object code has a regular structure that can be described by a context-free grammar (cfg). As utilized herein, "context-free grammar" refers to a class of formal language grammars in which rewriting rules can be applied to nonterminal symbols without regard to the context in which they occur. Context free grammars play a central role in the design of programming languages as they lend themselves to automated construction of fast, efficient parsers that are at the heart of compilers for such languages. In the context of this invention, the structure of the object code generated by the forward compiler is described by a context-free grammar, which fact enables it to be parsed using a fast, efficient parser that can be constructed using a parser construction tool, such as yacc.

The direct translation to object code enables the best sequence of instructions to be chosen to implement each block type used in the construction of the model. These building blocks form a special-purpose language to this compiler and the object code is custom-fit to the building blocks. The ability to reverse the object code back into equivalency with the model from which it was derived allows a user to prove that the model and its implementation match one another.

In one embodiment, an extractor, a forward compiler, a library of macros, a context-free grammar, and a reverse compiler are utilized to provide the above described functionality. The extractor tool converts a graphical model description into a simple textual representation of model components and their interconnections. More specifically, the extractor tool extracts the model components and their connectivity from their graphic representation. The compiler accepts a model built from the building blocks and outputs a sequence of macro calls implementing the model. The macros are templates of object code utilized to implement respective building blocks. The context-free grammar describes the object code generated for each building block, mirroring the macro for that block. The reverser tool takes the object code image and the grammar of code generated and produces the original model.

The forward complier, which is referred to herein as MORCf, is a model compiler that produces an executable object program from mathematical models of control systems. The models may be developed in a popular modeling language such as Simulink of MATLAB or SystemBuild of MATRIXx. However, to be vendor neutral, one embodiment of MORC uses a simple model description language of its own and model descriptions in Simulink or SystemBuild can be translated to MORC descriptions with relative ease.

MORC differs from conventional auto coders built into tools like MATLAB and MATRIXx in two important ways. First, unlike conventional auto coders, MORC produces no source code, but instead treats the model as the source program and compiles it directly into object (assembly) code of the target computer. Secondly, MORC compiles each model element into the same sequence of machine instructions (except for memory addresses they refer to) regardless of where the model element occurs in the overall model. The direct-to-object approach leads to superior object code performance, while the context-free object code structure leads to object code reversibility.

As mentioned above, object code produced by MORC can be reconstructed (reversed) into the model descriptions from which it was derived by the reverse compiler, which is referred to herein as MORCr. The reversibility of the object code back into the model form results in an automated way of verifying the object code to be in one-to-one correspondence with the model components. This reversibility is also an important attribute in regard to safety critical (Level A) systems built to comply with DO-178B standards.

The MORCf compiler and the MORCr reverser use a common description of how each modeling block is implemented in a specific target computer's instruction set. Two important attributes of this type of mapping strategy are that (a) it is context independent, that is, exactly the same sequence of instructions (except for the address in memory that they may refer to) implement the given block type regardless of where that block type is used in a larger model; and (b) when these object code sequences are arranged properly, model input data flows through these instruction sequences to produce the model's outputs.

The context independent mapping allows for the use of a context-free grammar to describe the translation of a model into its object code. The same context-free grammar enables construction of a parser to parse the object code and reconstruct the model components and their connectivity.

Model Terminology

The building blocks, or simply blocks, of a model are the lowest level components for which MORC generates a fixed sequence of instructions. A limiter, a summer and a gain are but three examples of such building blocks, whereas the term superblock refers to an interconnection of multiple building blocks that can be used as a specialized, complex building block. For example, a second order Tustin filter could be constructed as a superblock from more basic blocks and instances of it used to construct a flight control system. Therefore a superblock often refers to a small network of blocks that fits on a page when represented graphically, although there is no inherent limit on how many blocks can be in a superblock or how complicated the interconnections can be.

A model is a collection of superblocks, usually working together to "model" a more complex system than can be achieved by a single procedure. A model may have an associated iteration rate, which is the rate at which computations are invoked. In at least one embodiment, an external executive is utilized to invoke the model at the designated iteration rate.

In one contemplated application of MORC, a complex avionics system may contain hundreds or even thousands of models. However, MORC deals with one model at a time. To build such a complex system, MORC is invoked on each model in the system and the outputs of the various models are linked together to form the software implementation of the system.

MORC Object Code Structure

Figure 1:
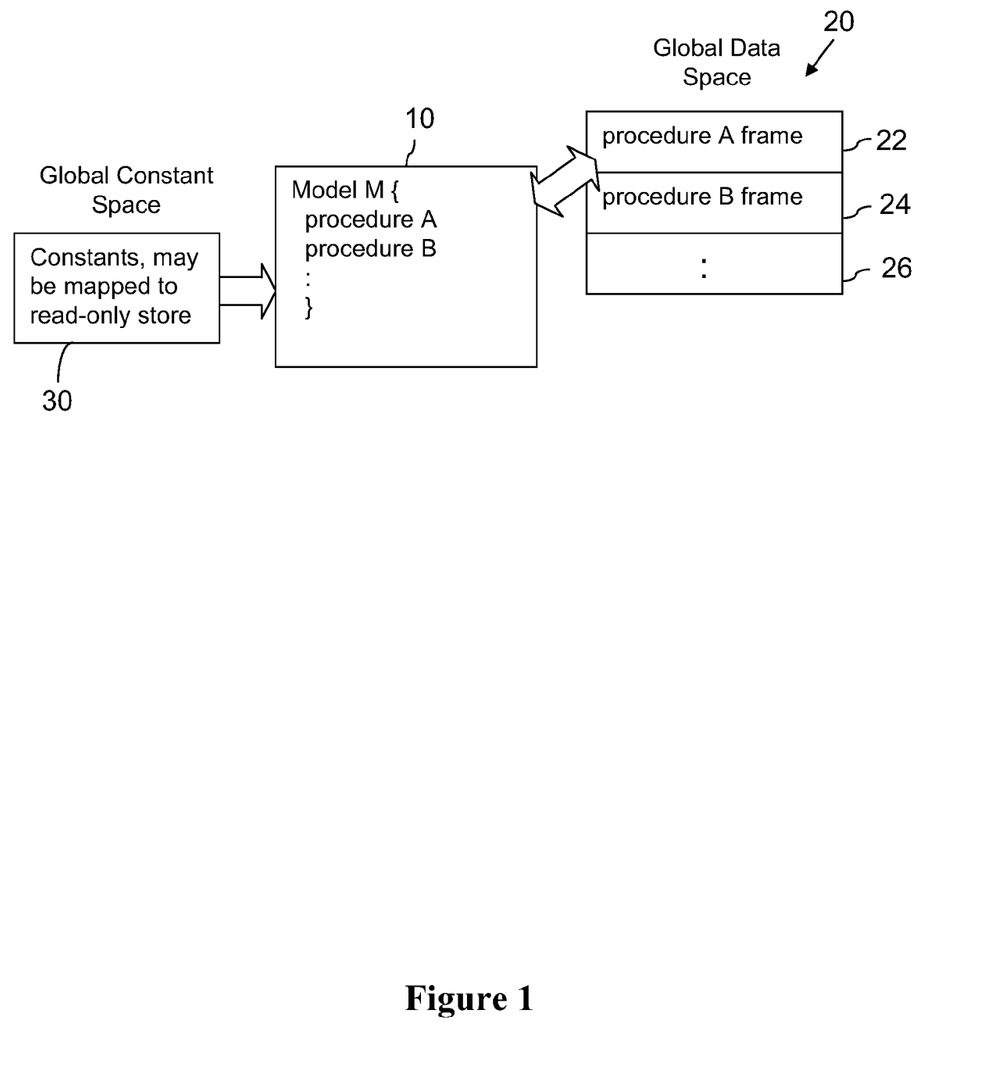
FIG. 1 illustrates a data environment for a model-to-object reversible compiler (MORC) that includes distinct data spaces.

When MORC transforms a model into object code, each superblock is transformed into a callable procedure, or subroutine. In one specific embodiment, these procedures operate in an environment that includes distinct data spaces, as illustrated in FIG. 1.

First, all procedures of the model 10 operate in a single common global data space 20, where all the inputs and outputs, including intermediate outputs, are stored. Each procedure in the model has a slice of this global data space 20 dedicated to it, called its frame, as illustrated by frames 22, 24, and 26. In a particular embodiment, a frame holds six classes of data pertaining to the superblock: input parameters, output parameters, intermediate outputs of internal blocks, temporary storage, state variables and subroutine linkage data. State variables are utilized if the superblock includes model elements with memory (e.g., a delay block). Temporary storage may be needed in the computational steps of more complex blocks, such as a multi-port switch. Subroutine linkage memory is used if a superblock "calls" another superblock.

A global constants space 30, common to all superblocks in the model, is a second of the distinct data spaces. The global constants space 30 is a collection of all unique constants used anywhere in the model 10. For example, the lower and upper bounds of a limiter block are constants, as are the multipliers of gain blocks. If a gain block uses 2.0 as the multiplier (or gain) and a limiter block in the same model uses 2.0 as its upper bound, then there only needs to be one copy of the constant 2.0 and that will reside in the global constant space 30 of the model 10.

Register Conventions

Although the basic concepts behind MORC are target-neutral, the compiler algorithms presented herein are based on the PowerPC target processor architecture. Register and address conventions as well as instructions mnemonics used herein are, therefore, those that are applicable to a PowerPC target processor.

In typical target computer instructions, a memory address consists of two components, an offset and a base register, written as offset(base). For example, 8(r1) is a memory address where r1 is the base register and 8 is the offset.

As noted above, general purpose registers are referred by the notation r0, r1, ... r31. Floating-point registers are referred to as f0, f1, ... f31. In one embodiment of MORC, there are two general-purpose registers and one floating-point register that are set aside for special use and are sometimes represented and described herein by mnemonics rather than by a register number, thereby providing clarity. Register r30 is referred to as rGD and points at the base of the global data space (shown as 20 in FIG. 1). Register r31 is referred to as rGC and points at the base of the global constants space (shown as 30 in FIG. 1). Floating-point register f30, which must be preloaded with the constant 0.0, is referred to as f_0_0.

Calling Conventions

To call a procedure in a MORC generated model certain calling conventions are observed. The calling conventions include preloading certain general-purpose registers and certain floating-point registers. In an embodiment, when MORC generated code calls another procedure in a MORC generated model, these calling conventions are automatically followed. However, in such an embodiment, when an executive invokes a model, the following calling conventions are used. The rGD register is preloaded with the address of the global data space of the model. The rGC register is preloaded with the address of the global constants space. The floating-point register f_0_0 is preloaded with the constant 0.0. In addition, the input parameters portion of the frame for the entry procedure is populated with the inputs to the procedure.

Another calling convention is the saving, and restoring upon return, of any other general-purpose register, and any floating-point registers or the counter register whose contents need to be preserved are the responsibility of the calling executive. Additionally, the calling executive enters the entry procedure via a branch and link instruction. These instructions provide the return address in a register, LR, for MORC generated code to use to return to the caller.

Upon return from the MORC generated entry procedure, the calling executive finds the outputs of the procedure in the outputs portion of the procedure's frame. Likewise, the intermediate outputs portion of the frame contains the outputs from the respective internal blocks of the procedure. Preloaded general-purpose registers as well as floating-point registers retain their contents as preloaded. Therefore in certain embodiments, the caller is able to take advantage of this and not reload these registers for subsequent calls.

Although models are usually displayed and manipulated in graphical form, modeling packages use a text or binary representation to save models to external media. Unfortunately, such representations are vendor-unique and contain extraneous information not relevant to code generation. Therefore, MORC incorporates a language, sometimes referred to herein as ML, to represent models. As further illustrated herein, the simpler representation in ML can be readily constructed from the more elaborate representation used by commercial modeling packages.

Figure 2:
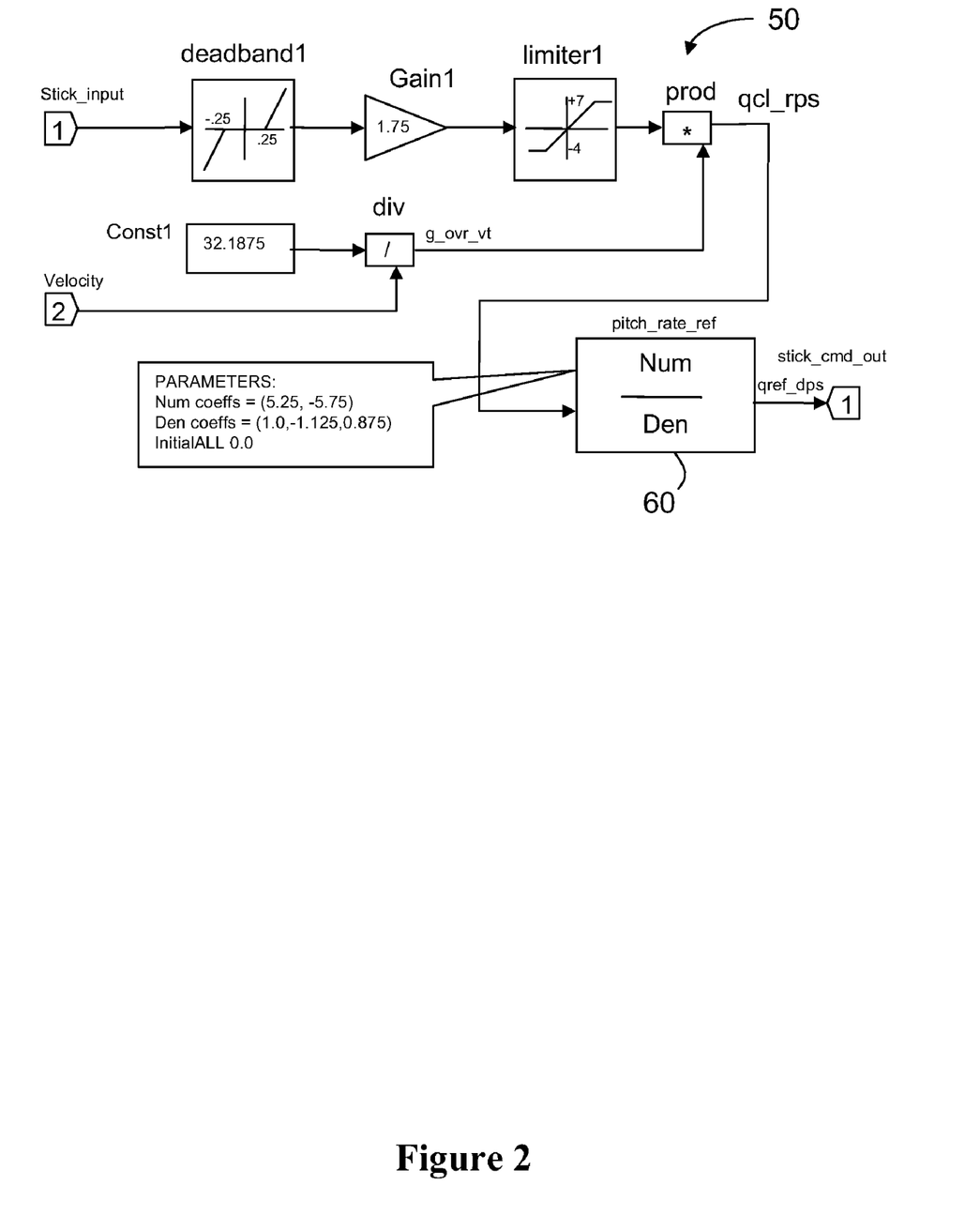
FIG. 2 is a representation of a model.

As described above, a model is translated by the MORC forward compiler (MORCf) into object code and that object code can then be parsed back into the model specification by the MORC reverse compiler (MORCr). A simple model 50, sometimes referred to herein by the name Stick_Logic is shown in FIG. 2. Model 50, which is a single superblock named Stk_Logic, is used to illustrate the above mentioned forward compilation and reverse compilation steps. Model 50 includes a number of blocks, for example, Num/Den 60. Although the Stick_Logic example does not contain such an instance, a model may include a number of superblocks, including superblocks that "call" other superblocks. An ML representation of the Stick_Logic model is provided in Table 1.

TABLE 1

An ML representation of the model Stick_Logic

```
 1 : // Illustrate MORC compilation and reversal
 2 : MODEL stick_logic {
 3 :
 4 :   PROCEDURE stk_logic {
 5 :
 6 :     INPUT FLOAT stick_input;
 7 :     INPUT FLOAT velocity;
 8 :     OUTPUT FLOAT stick_cmd_out;
 9 :
10 :     BLOCK DEADBAND deadband1 {
11 :       INPUT FLOAT stick_input;
12 :       OUTPUT FLOAT y;
13 :       PARAMETER HalfBand = 0.25;
14 :     }
15 :     BLOCK GAIN gain1 {
16 :       INPUT FLOAT deadband1.y;
17 :       OUTPUT FLOAT y;
18 :       PARAMETER GainValue = 1.75;
19 :     }
20 :     BLOCK CONSTANT const1 {
21 :       OUTPUT FLOAT y;
22 :       PARAMETER ConstantValue = 32.1875;
23 :     }
24 :     BLOCK LIMITER limiter1 {
25 :       INPUT FLOAT gain1.y;
26 :       OUTPUT FLOAT y;
27 :       PARAMETER UpperLimit = +7.0;
28 :       PARAMETER LowerLimit = −4.0;
29 :     }
30 :     BLOCK ELEMENTDIVISION div {
31 :       INPUT FLOAT const1.y;
32 :       INPUT FLOAT velocity;
33 :       OUTPUT FLOAT g_ovr_vt;
34 :     }
35 :     BLOCK ELEMENTPRODUCT prod {
36 :       INPUT FLOAT limiter1.y;
37 :       INPUT FLOAT div.g_ovr_vt;
38 :       OUTPUT FLOAT qc1_rps;
39 :     }
40 :     BLOCK NUMDEN pitch_rate_ref {
41 :       INPUT FLOAT prod.qc1_rps;
42 :       OUTPUT FLOAT qref_dps = stick_cmd_out;
43 :       PARAMETER NumDenOrder = (1, 2);
44 :       PARAMETER Coefficients = (5.25,−5.75, 1.0, −1.125, 0.875);
45 :       PARAMETER InitialAll = 0.0;
46 :     }
47 :
48 :   } // procedure stk_logic
49 : } // model stick_logic
```

Forward Compiler and Reverse Compiler Terminology

The textual representation of the Stick_Logic model shown in Table 1 is written in the modeling language ML. The syntax for describing a model in ML is provided in Table 2. The notation utilized is sometimes referred to as Extended Backus-Naur Form.

Conventions associated with the above syntax include: capitalized words are reserved and cannot be used as user-defined identifiers. Words with capitalized first letter stand for user supplied strings with familiar syntax, e.g., an identifier is a string starting with a letter of the alphabet and possibly followed by letters, decimal digits and the underscore character. The spelling is case-insensitive, but cannot match a reserved word regardless of case. The case of an identifier should be consistent throughout the model and the reserved words should always be spelled in all upper case letters. Examples include: K, LowerLimit, Upper_Limit, gain, input1. An integer is a decimal number, signed or unsigned. A real number is an integer string with exactly one decimal point embedded between two digits. All real number constants must have an exact representation on the target processor. Examples include: 8.625, −6.0, +0.5625. Comments beginning with // may be inserted at the end of any line. Blank lines and comment lines may be inserted any where in the MDL description.

TABLE 2

Syntax of Modeling Language ML

```
model_input =
    MODEL model_id '{'
        { procedure_spec }
    '}' ;
model_id =
    Identifier ;
procedure_spec =
    PROCEDURE procedure_id '{'
        { input_spec }
        { output_spec }
        { block_spec }
    '}' ;
procedure_id =
    Identifier ;
input_spec =
    INPUT signal_type signal_id ';' ;
signal_type =
    FLOAT ;
(* Other data types may be added here *)
signal_id =
    Identifier ;
output_spec =
    OUTPUT signal_type signal_id ';' ;
block_id =
    Identifier ;
block_spec =
    BLOCK block_type block_id '{'
        { block_input_spec }
        { block_output_spec }
        { parameter_spec }
    '}' ;
block_type =
        DEADBAND
      | LIMITER
      | CONSTANT
      | GAIN
      | ELEMENTPRODUCT
      | ELEMENTDIVISION
      | NUMDEN12
        (* other block types may be added here *)
      ;
block_input_spec =
    INPUT signal_type signal_name ';' ;
signal_name =
    [ block_id '.' ] signal_id ;
```

TABLE 2-continued

Syntax of Modeling Language ML

```
(* block_id prefix is omitted if signal is a procedure input *)
block_output_spec =
    OUTPUT signal_type signal_id [ '=' proc_output_id ] ';' ;
proc_output_id =
    Identifier ;
parameter_spec =
    PARAMETER parameter_id '=' value ';' ;
parameter_id =
    Identifier ;
value =
    Integer
    | Real_Number
    (* Other constant types, such as Boolean, may be added here *)
    | value_list ;
value_list =
    '(' value { ',' value } ')' ;
```

The compilation algorithm used by the MORCf is described below. The compiler works from a parse tree constructed by the parser for the ML grammar shown in Table 2. The compiler algorithm makes extensive use of tree traversal, which is indicated using an intuitive notation. If N is a node of the parse tree, then N>grammar_symbol refers to the child of N that is named grammar_symbol. The child so referenced may be a repeating group, such as {input_spec}, in which case a subscript may be used to refer to a specific occurrence, e.g., P>{input spec}(1) will refer to the first input spec in the group of input specs under P. The notation P>n, for a number n, refers to the nth child of P. The notation P+n refers to the nth sibling to the right of P. Both the >operator and the +operator are left associative.

Forward Translation

The MORC forward compiler 100 is relatively simple due to the fact that there is a simple correspondence between block type and the macro that implements the function. Use of macros (rather than sequences of assembly language statements) has the advantage of simplifying the translation and making the translation portable across targets. For example, to port MORC to a MIPS processor target, one would only need to rewrite the macro bodies with MIPS assembly instructions that achieve the same effect.

The MORC forward compiler algorithm is provided in Table 3 below. The compiler makes two passes over the procedures in the model. During the first pass, code is generated for the cyclic computational steps to produce current cycle output and to update of state information, if applicable, using two passes over the blocks in each procedure. During the second pass over the procedures, code is generated for initialization of blocks containing state information.

TABLE 3

MORC forward compiler algorithm

Step 1: Parse the input model into a parse tree per grammar in Table 2. Let R be the
    root node, corresponding to model_input.
Step 2: Set MN = Value (R > model_id); Emit ("MODEL " + MN)
Step 3: for each P in R > {procedure_spec} do steps 3.0-3.9
    /* 1st pass over procedures */
Step 3.0: Order the block_specs in procedure P such that if a required input to block A
    is computed by block B, then block B is ahead of block A in the list.
Step 3.1: for each I in P > {input_spec} do
        Assign address in GD to (I > signal_id);
        Emit ("INPF " + Addr (I > signal_id));
Step 3.2: for each O in P > {output_spec} do
        Assign address in GD to (O > signal_id);
        Emit ("OUTF " + Addr (O > signal_id));
Step 3.3: for each B in P > {block_spec} do
        for each BO in B > {block_output_spec} do
            If (BO > signal_id) is not mapped to a procedure output then
                Assign address in GD to (BO > signal_id).

TABLE 3-continued

MORC forward compiler algorithm

```
Step 3.4: for each B in P > {block_spec} do {
             Assign address in GD to any state variables, State_Info(B), applicable to B
             for each BP in B > {parameter_spec} do {
                 Assign address in GC to (BP > parameter_id); } }
Step 3.5: EMIT ("PROC "+ MN + "." + Value (P > procedure_id))
Step 3.6: for each B in P > {block_spec} do { /* 1st pass over blocks, curr output */
             case Value (B > block_type):
             DEADBAND =>
                 Emit ("DEADBAND_F " +
                     "input=" + Addr (B > {block_input_spec}(1) > signal_name) +
                     ",half_bandwidth=" +
                     Addr (find_parm (B > 1, "HalfBand")) +
                     ",output=" + Addr (B > {block_output_spec}(1) > signal_id)).
             LIMITER =>
                 : (other cases omitted for brevity)
             NUMDEN12 =>
                 Emit ("NUMDEN12_F " +
                     "coeffs_at=" + Addr (find_parm (B > 1, "Coefficients")) +
                     ",state_at=" + Addr (State_Info (B)) +
                     ",output=" + Addr (B > {block_output_spec}(1) > signal_id)))
             end case. }
Step 3.7: Emit ("UPDATE")
Step 3.8: for each B in P > {block_spec} do { /* 2nd pass over blocks, update states */
             case Value (B > block_type):
             NUMDEN12 =>
                 Emit ("NUMDEN12UPD_F " +
                     "input=" + Addr (B > {block_input_spec}(1) > signal_name)) +
                     ",state_at=" + Addr (State_Info (B)) +
                     ",output=" + Addr (B > {block_output_spec}(1) > signal_id)))
             OTHERS => do nothing /* no state info associated with these */
             end case; }
Step 3.9: Emit ("ENDPROC");
Step 4: Emit ("INITPROC");
Step 5: for each P in R > {procedure_spec} do { /* 2nd pass over procedures */
             for each B in P > {block_spec} do {
                 case Value (B > block_type):
                 NUMDEN12 =>
                     Emit ("NUMDEN12INI_F " +
                         "init=" + Addr (B > {parameter_spec}("InitialAll")) +
                         ",state_at=" + Addr (State_Info (B))
                 OTHERS => do nothing
                 end case; } }
Step 6: Emit ("ENDPROC");
Step 7: Emit ("ENDMODEL");
Step 8: Emit ("GDATA "+ MN + "._GD," +
             integer_image (next available addr in GD));
Step 9: Emit ("GCONST " + MN + "._GC");
       for each PI in (parameter_ids assigned to GC in order) do {
           Emit ("GCF " + float_image (Value (PI))); }
end algorithm MORCf;
```

The translation by the MORC forward compiler 100 of the model into PowerPC assembler instructions is illustrated in Table 4. MORCf generates macros which are then expanded to primitive instructions by the assembler 102. Table 4 illustrates both the macros (shown in boldface) and their expansion into assembly code.

TABLE 4

Code generated by MORCf for model Stick_Logic

| MODEL | Stick_Logic |
|---|---|
| .section ".text" | |
| .global | Stick_Logic |
| Stick_Logic: | |
| .int | 0x00000001 |
| INPF | 0(rGD) |
| lfs | f0,0(rGD) |
| INPF | 4(rGD) |
| lfs | f0,4(rGD) |
| OUTF | 8(rGD) |
| stfs | f0,8(rGD) |
| PROC | Stick_Logic.stk_logic |

TABLE 4-continued

Code generated by MORCf for model Stick_Logic

| .int | 0x00000002 |
|---|---|
| .global | Stick_Logic.stk_logic |
| Stick_Logic.stk_logic: | |
| DEADBAND_F | input=0(rGD),half_bandwidth=0(rGC), output=12(rGD) |
| lfs | f1,0(rGD) |
| lfs | f2,0(rGC) |
| fadd | f3,f1,f2 |
| fsel | f3,f3,f_0_0,f3 |
| fsub | f4,f1,f2 |
| fsel | f4,f4,f4,f_0_0 |
| fsel | f1,f1,f4,f3 |
| stfs | f1,12(rGD) |
| GAIN_F | input=12(rGD),gain=4(rGC),output=16(rGD) |
| lfs | f1,12(rGD) |
| lfs | f2,4(rGC) |
| fmul | f1,f1,f2 |
| stfs | f1,16(rGD) |
| LIMITER_F | input=16(rGD),llmt=8(rGC),ulmt=12(rGC), output=20(rGD) |

TABLE 4-continued

Code generated by MORCf for model Stick_Logic

```
      lfs         f1,16(rGD)
      lfs         f2,8(rGC)
      fsub        f3,f1,f2
      fsel        f1,f3,f1,f2
      lfs         f2,12(rGC)
      fsub        f3,f1,f2
      fsel        f1,f3,f2,f1
      stfs        f1,20(rGD)
      CONSTANT_F  input=16(rGC),output=24(rGD)
      lwz         r1,16(rGC)
      stw         r1,24(rGD)
      ELEMDIV_F   input1=24(rGD),input2=4(rGD),output=28(rGD)
      lfs         f1,24(rGD)
      lfs         f2,4(rGD)
      fdiv        f1,f1,f2
      stfs        f1,28(rGD)
      ELEMPROD_F  input1=20(rGD),input2=28(rGD),output=32(rGD)
      lfs         f1,20(rGD)
      lfs         f2,28(rGD)
      fmul        f1,f1,f2
      stfs        f1,32(rGD)
      NUMDEN12_F  coeffs_at=28(rGC),state_at=36(rGD),
                  output=8(rGD)
      la          r1,28(rGC)
      la          r2,36(rGD)
      fmr         f1,f_0_0
      lfs         f2,0(r1)
      lfs         f3,0(r2)
      fmadd       f1,f2,f3,f1
      lfs         f2,4(r1)
      lfs         f3,4(r2)
      fmadd       f1,f2,f3,f1
      lfs         f2,8(r1)
      lfs         f3,8(r2)
      fnmsub      f1,f2,f3,f1
      lfs         f2,12(r1)
      lfs         f3,12(r2)
      fnmsub      f1,f2,f3,f1
      stfs        f1,8(rGD)
      UPDATE
      or          r1,r1,r1
      NUMDEN12UPD_F input=32(rGD),state_at=36(rGD),output=8(rGD)
      la          r1,36(rGD)
      lfs         f1,32(rGD)
      lfs         f2,8(rGD)
      lfs         f3,0(r1)
      stfs        f1,0(r1)
      stfs        f3,4(r1)
      lfs         f3,8(r1)
      stfs        f2,8(r1)
      stfs        f3,12(r1)
      ENDPROC
      blr
      INITPROC    Stick_Logic._init
      .int        0x00000003
      .global     Stick_Logic._init
Stick_Logic._init:
      NUMDEN12INI_F init=40(rGC),state_at=36(rGD)
      la          r1,36(rGD)
      lfs         f1,40(rGC)
      stfs        f1,0(r1)
      stfs        f1,4(r1)
      stfs        f1,8(r1)
      stfs        f1,12(r1)
      ENDPROC
      blr
      ENDMODEL
      .int        0x00000011
      GDATA       Stick_Logic._GD,52
      .section ".data"
      .align 3
      .global     Stick_Logic._GD
Stick_Logic._GD:
      .org        .+52+8
      GCONST      Stick_Logic._GC
      .section ".rodata"
      .align 3
      .global     Stick_Logic._GC
Stick_Logic._GC:
      GCF         0.25
      .float      0.25
      GCF         1.75
      .float      1.75
      GCF         −4.0
      .float      −4.0
      GCF         7.0
      .float      7.0
      GCF         32.1875
      .float      32.1875
      GCF         5.25
      .float      5.25
      GCF         −5.75
      .float      −5.75
      GCF         1.0
      .float      1.0
      GCF         −1.125
      .float      −1.125
      GCF         0.875
      .float      0.875
      GCF         0.0
      .float      0.0
```

The object code generated by MORCf, assembled, linked and loaded in memory, follows a context-free grammar as well. Table 5 depicts a portion of that grammar that is relevant to the Stick_Logic example. As with ML above, a variant of Extended Backus-Naur Form is used to describe the syntax, which is used to reverse compile the object code to an ML description. Instructions and constant data in memory are the lexicons. They are extracted by a lexical analyzer that parses each word into either an instruction of the form: I:opcode{.operands} or a constant of the form C:hh.hh.hh.hh where each hh represents one byte of hexadecimal data. An address in global data space is designated as gdaddr and, likewise, an address in global constants space is designated as gcaddr. In the grammar below, lexicons are shown in bold typeface.

TABLE 5

Syntax of Target Computer Object Code

```
model_in_memory =
    model_mark
    { proc_in_memory }
    init_proc_in_memory
    model_end ;
proc_in_memory =
    { input_descr }
    { output_descr }
    proc_mark
    { block_in_memory }
    update_mark
    { update_in_memory }
    proc_end ;
input_descr =
    float_input_descr ;
float_input_descr =
    I:lfs.f0.gdaddr ;
output_descr =
    float_output_descr ;
float_output_descr =
    I:stfs.f0.gdaddr ;
block_in_memory =
    deadband_in_memory
    | limiter_in_memory
    | constant_in_memory
    | gain_in_memory
    | elementproduct_in_memory
    | elementdivision_in_memory
    | numden12_in_memory ;
```

TABLE 5-continued

Syntax of Target Computer Object Code

```
deadband_in_memory =
    I:lfs.f1,gdaddr        (* gdaddr parses to offset(rGD) *)
    I:lfs.f2,gcaddr        (* gcaddr parses to offset(rGC) *)
    I:fadd.f3,f1,f2
    I:fsel.f3,f3,f_0_0,f3  (* f_0_0 is a fp reg preloaded with 0.0)
    I:fsub.f4,f1,f2
    I:fsel.f4,f4,f4,f_0_0
    I:fsel.f1,f1,f4,f3
    I:stfs.f1,gdaddr ;
(* similarly for limiter, constant, gain, ... blocks *)
numden12_in_memory =
    I:la.r1,gcaddr
    I:la.r2,gdaddr
    I:fmr.f1,f_0_0         (* f_0_0 is preloaded with 0.0 *)
    I:lfs.f2,0(r1)
    I:lfs.f3,0(r2)
    I:fmadd.f1,f2,f3,f1
    I:lfs.f2,4(r1)
    I:lfs.f3,4(r2)
    I:fmadd.f1,f2,f3,f1
    I:lfs.f2,8(r1)
    I:lfs.f3,8(r2)
    I:fnmsub.f1,f2,f3,f1
    I:lfs.f2,12(r1)
    I:lfs.f3,12(r2)
    I:fnmsub.f1,f2,f3,f1
    I:stfs.f1,gdaddr ;
block_in_memory =
    numden12upd_in_memory ;
(* similarly for other block types with state information *)
numden12upd_in_memory =
    I:la.r1,gdaddr
    I:lfs.f1,gdaddr
    I:lfs.f2,gdaddr
    I:lfs.f3,0(r1)
    I:stfs.f1,0(r1)
    I:stfs.f3,4(r1)
    I:lfs.f3,8(r1)
    I:stfs.f2,8(r1)
    I:stfs.f3,12(r1) ;
init_proc_in_memory =
    init_proc_mark
    { block_init_in_memory }
    proc_end ;
block_init_in_memory =
    numden12ini_in_memory ;
numden12ini_in_memory =
    I:la.r1,gdaddr
    I:lfs.f1,gcaddr
    I:stfs.f1,0(r1)
    I:stfs.f1,4(r1)
    I:stfs.f1,8(r1)
    I:stfs.f1,12(r1)
model_mark =
    C:00.00.00.01 ;
model_end =
    C:00.00.00.11 ;
proc_mark =
    C:00.00.00.02 ;
proc_end =
    I:blr ;
update_mark =
    I:or.1.1.1 ; (* special no-op marks update section *)
init_proc_mark =
    C:00.00.00.03 ;
```

The MORC reverse compiler algorithm is provided in Table 6 below. The description employs the same notations for tree traversal as the forward compiler algorithm depicted in Table 3.

The reverse compiler MORCr begins by parsing the object code that correspond to the model and constructing a parse tree. It then traverses the parse tree and generates the ML description of the model. Since the order of the nodes of the parse tree reflects the order in which procedures were encountered in the original ML description, the regenerated ML source will have the procedures listed in the same order. For a given procedure, MORCr traverses block_in_memory nodes in the order in which they appear in the parse tree and reconstructs the source for each block. This order corresponds to the partial order in which block_spec nodes were arranged in step 3.0 of MORCf, and may not correspond to the order in which blocks were written in the original ML source. As will be demonstrated later, this structural difference has no impact on the functional aspects of the procedure.

Another source of structural differences between original and reconstructed ML descriptions is in the names of entities such as model, procedures, blocks and signals. Since the symbolic names used in the original model description are typically not available in the object code, the reverse compiler synthesizes names as needed. A method to deal with such innocuous differences between original and reconstructed ML source will be described following the presentation of the reverse compiler algorithm.

TABLE 6

MORC reverser algorithm

Step 1: Parse object code in memory according to grammar in Table 5. Let R be the root of the parse tree. Let GC be the base address of global constants region;
Step 2: Emit ("MODEL " + make_model_name(M) + " {");
    Set IP = R > init_proc_in_memory > {block_init_in_memory}(1);
Step 3: for each P in R > {proc_in_memory} do steps 3.0-3.5
Step 3.0: /* Associate inputs and outputs with names and addresses in GD */
    for each I in P > {input_descr} do {
        Associate make_input_name(gdaddr (I)); }
    for each O in P > {output_descr} do {
        Associate make_output_name(gdaddr (O)); }
Step 3.1: Emit (" PROCEDURE " + make_proc_name(P) + " {");
    Set U = P > {update_in_memory}(1); /* nil if update section is empty */
Step 3.2: for each I in P > {input_descr} do {
    Set IN = find_associated_name(I);
    Emit ("   INPUT FLOAT " + IN + ":"); }
Step 3.3: for each O in P > {output_descr} do {
    Set ON = find_associated_name (O);
    Emit ("   OUTPUT FLOAT " + ON + ":"); }
Step 3.4: for each B in P > {block_in_memory} do steps 3.4.1-3.4.2
Step 3.4.1: Set BN = make_block_name(B)

TABLE 6-continued

MORC reverser algorithm

```
Step 3.4.2: case (B > 1):
        deadband_in_memory =>
            Emit ("   BLOCK DEADBAND " + BN + " {");
            Emit ("    INPUT FLOAT " + get_name (gdaddr (B > 1 > 1)) + ";");
            Set XO = get_name (gdaddr (B > 1 > 8)); /* may be nil */
            Set ON = make_output_name(B > 1 > 8);
            if XO = nil then /* not an external output */
                Assign new address in GD to ON;
                Emit ("    OUTPUT FLOAT " + ON + ";");
            else
                Emit ("    OUTPUT FLOAT " + ON + " = " + XO + ";");
            end if;
            Emit ("    PARAMETER HalfBand = "
                + float_image (gcaddr (B > 1 > 2));
            Emit ("   }");
        limiter_in_memory =>
            : (other cases omitted for brevity)
        numden12_in_memory =>
            Emit ("   BLOCK NUMDEN " + BN + " {");
            Emit ("    INPUT FLOAT " + get_name (gdaddr (U > 1 > 2)) + ";");
            Set XO = get_name (gdaddr (B > 1 > 16)); /* may be nil */
            Set ON = make_output_name(B > 1 > 16);
            if XO = nil then
                Assign new address in GD to ON;
                Emit ("    OUTPUT FLOAT " + ON + ";");
            else
                Emit ("    OUTPUT FLOAT " + ON + " = " + XO + ";");
            end if;
            Emit ("    PARAMETER NumDenOrder = (1, 2); ");
            Emit ("    PARAMETER Coefficients = ("
                + float_image (gcaddr (B > 1 > 1)) + ", " +
                + float_image (gcaddr (B > 1 > 1) + 4) + ", " +
                + float_image (gcaddr (B > 1 > 1) + 8) + ", " +
                + float_image (gcaddr (B > 1 > 1) + 12) + "," +
                + float_image (gcaddr (B > 1 > 1) + 16) + ");");
            Emit ("    PARAMETER InitialAll = "
                + float_image (gcaddr (IP > 1 > 2)) + ";");
            Set IP = IP + 1; Set U = U + 1;
            Emit ("   }");
        end case;
Step 3.5: Emit (" }");
Step 4: Emit ("}");
end algorithm MORCr;
```

The ML description of the model reconstructed by MORCr is shown Table 7.

TABLE 7

Model Stick_Logic reconstructed from executable image

```
 1 : MODEL m1 {
 2 :   PROCEDURE p1 {
 3 :     INPUT FLOAT xi1;
 4 :     INPUT FLOAT xi2;
 5 :     OUTPUT FLOAT xo1;
 6 :     BLOCK DEADBAND b1 {
 7 :      INPUT FLOAT xi1;
 8 :      OUTPUT FLOAT y1;
 9 :      PARAMETER HalfBand = 0.25;
10 :     }
11 :     BLOCK GAIN b2 {
12 :      INPUT FLOAT b1.y1;
13 :      OUTPUT FLOAT y1;
14 :      PARAMETER GainValue = 1.75;
15 :     }
16 :     BLOCK LIMITER b3 {
17 :      INPUT FLOAT b2.y1;
18 :      OUTPUT FLOAT y1;
19 :      PARAMETER LowerLimit = −4.0;
20 :      PARAMETER UpperLimit = +7.0;
21 :     }
22 :     BLOCK CONSTANT b4 {
23 :      OUTPUT FLOAT y1;
24 :      PARAMETER ConstantValue = 32.1875;
25 :     }
26 :     BLOCK ELEMENTDIVISION b5 {
27 :      INPUT FLOAT b4.y2;
28 :      INPUT FLOAT xi2;
29 :      OUTPUT FLOAT y1;
30 :     }
31 :     BLOCK ELEMENTPRODUCT b6 {
32 :      INPUT FLOAT b3.y1;
33 :      INPUT FLOAT b5.y1;
34 :      OUTPUT FLOAT y1;
35 :     }
36 :     BLOCK NUMDEN b7 {
37 :      INPUT FLOAT b6.y1;
38 :      OUTPUT FLOAT y1 = xo1;
39 :      PARAMETER NumDenOrder = (1, 2);
40 :      PARAMETER Coefficients = (5.25, −5.75, 1.0, −1.125, 0.875);
41 :      PARAMETER InitialAll = 0.0;
42 :     }
43 :
44 :   }
45 : }
```

Figure 3:
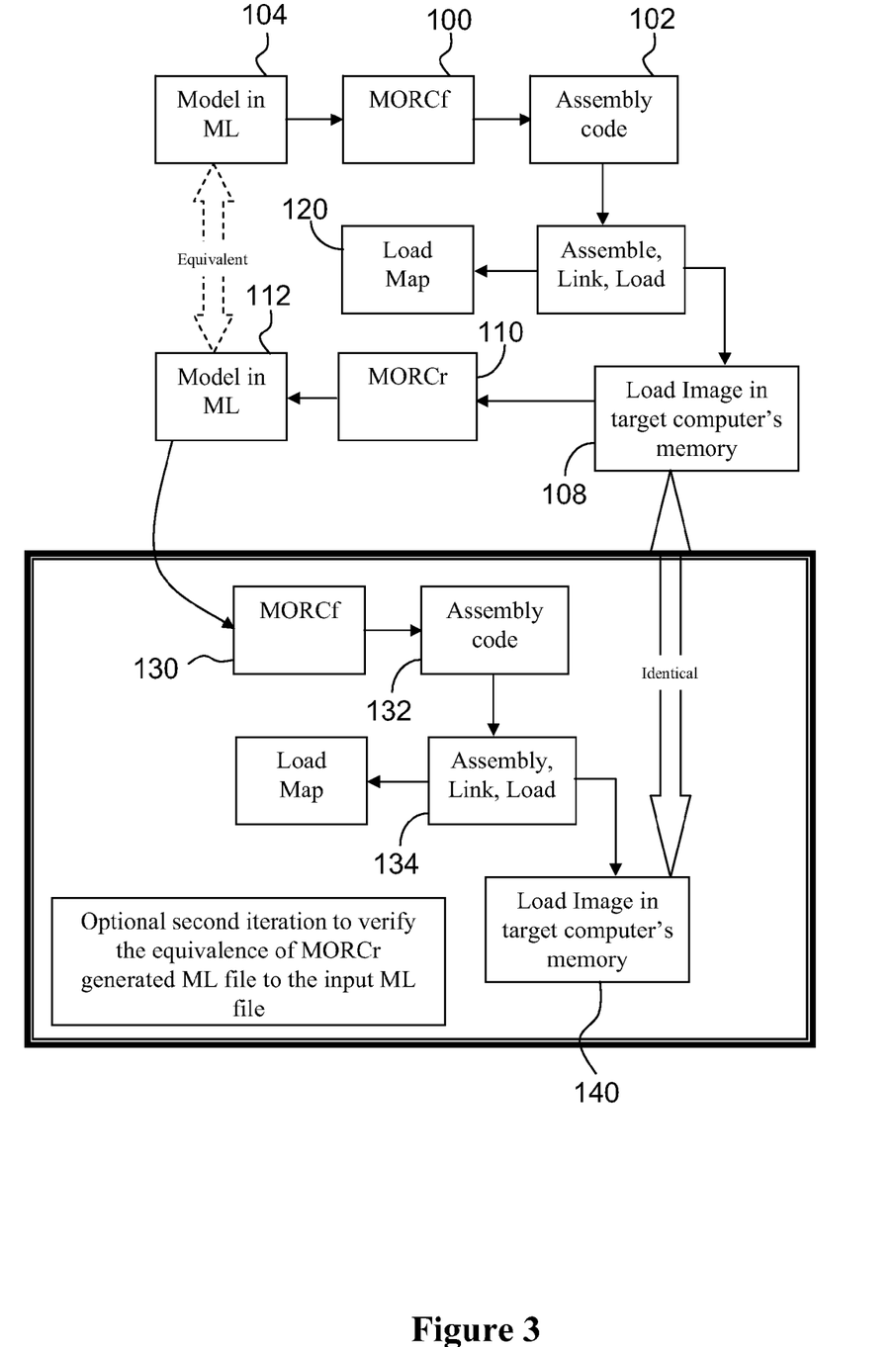
FIG. 3 is a block diagram illustrating processes associated with model reconstruction and verification of the reconstruction.

As illustrated more generally in FIG. 3, the MORC forward compiler 100 utilizes macros to generate object (assembly) code 102 from the model 104. The object code is linked and loaded resulting in a load image 108. Use of the macros not only simplifies the MORC forward compiler 100, it also makes it easier to port MORC as a whole to another target computer. In most cases, such porting can be accomplished by a rewriting of the macros. The context-free grammar used by the MORC reverser 110 to reconstruct the model (reconstructed model 112) is derived directly from the bodies of these macros, providing the link between forward and reverse translations.

The regenerated ML code is equivalent to the original ML input to the MORC forward compiler 100 except for possible differences in the names of procedures, blocks and signals (e.g., Stick_Logic v. m1), spacing of ML tokens, line breaks, omission of comments (e.g., line 1), order of block parameters (e.g., LowerLimit and UpperLimit of Limiter block), and order of blocks (e.g., order of Constant and Limiter blocks). Although these differences have no impact on the functionality of the model, they do make verification of the equivalence between the original model and the reconstructed model a non-trivial task. However, as FIG. 3 further illustrates, this difficulty is overcome by recompiling the regenerated model 112 using the MORC forward compiler 130 to generate object (assembler) code 132 which is linked and loaded 134 to rebuild an executable image 140. The object code corresponding to the model in the rebuilt load image 140 should be identical to that in the original load image 108, as is also shown by FIG. 3, confirming the equivalency.

The MORC reverse compiler reconstructs a model from its object code. The key is in two attributes of the object code: (a) The object code generated from a given block type has the same structure (grammar) no matter where it occurs in the model (context-free); the only source of differences being the addresses used to refer to inputs, outputs, constants and state variables, and (b) Information flow between blocks is always achieved via data stored in global data space; each signal has a unique address in GD, which allows the reverser to discover connections between blocks. As described above, the MORC reverse compiler works from a dump of the memory containing the object code and global constants space, the starting address of the first procedure in the model, and the starting address of global constants space, and the knowledge that the object code corresponding to the executable procedures of the model follow the cfg, a portion of which was depicted in Table 5.

Even though a simple example was utilized herein to illustrate the capabilities of MORC, the argument can be extended to larger models. There are no particular restrictions on what block types MORC can handle, but the task of generating a proper set of macros and a corresponding set of reverse cfg's will remain.

Block types with vector inputs can also be implemented in MORC. In many cases, the vector inputs can be iterated over as if the block is replicated for a series of scalar inputs. In other cases where the elements of the vector are processed to produce a scalar output (e.g., a Summer block with a single input vector and a scalar output), a loop may be used in the translation. The corresponding reverse cfg will involve a set of recursive productions.

Past experience with various aircraft control system suppliers has shown that they incur considerable cost (multi-million dollars) in achieving throughput levels needed to implement model-based control systems on contemporary processors and in verifying their correctness. Preliminary data from an implementation of the familiar signal selection and fault detection (SSFD) algorithm shows that throughput requirements can be reduced by up to 50% by the use of the techniques described herein.

While the invention has been described in terms of various specific embodiments, those skilled in the art will recognize that the invention can be practiced with modification within the spirit and scope of the claims.

What is claimed is:

1. A method for verifying a software implementation generated from a model that includes a plurality of model elements, said method comprising:
    converting a model description into a textual representation of model elements and interconnections between the model elements;
    defining a series of assembler macros that implement the functionality of the model elements as sequences of assembly instructions for a target processor;
    compiling the textual representation into an object code image using the macros;
    describing the object code image in a context-free grammar;
    reproducing the model description from the object code image and the context-free grammar, wherein the context-free grammar is derived for reconstruction of the model directly from the macros;
    recompiling, by a reverse compiler, the reproduced model description into an executable object code image; and
    comparing the executable object code image from the reproduced model description to an executable object code image produced from an original model description.

2. The method according to claim 1 wherein the model description includes a plurality of building blocks, the object code image custom fit to the building blocks.

3. The method according to claim 2 wherein compiling the textual representation comprises outputting a sequence of macro calls to implement the model, the macros including templates of object code.

4. The method according to claim 2 wherein compiling the textual representation comprises utilizing a common description of how a model building block is implemented in an instruction set associated with a target computer.

5. The method according to claim 2 wherein reproducing the model description comprises parsing the object code image to reconstruct model components and their connectivity within the model.

6. The method according to claim 1 wherein compiling the textual representation into an object code image comprises compiling like model elements into the same sequence of instructions regardless of where the like model elements are located within the model description.

7. The method according to claim 1 further comprising:
    defining a single common global data space for operation of all of the model elements and storage of inputs and outputs associated with the model elements, each model element associated with a frame defined within the common global data space; and
    defining a global constants space for constants used within the model.

8. A system configured for verification of software implementations that are generated from models, the models including one or more model elements, said system comprising:
    an extractor tool configured to utilize a graphical representation of a model to produce a textual representation of the model, including model elements and interconnections between model elements;
    a forward compiler configured to implement the representation of the model as an object code image using a plurality of assembler macros, wherein the macros are configured to implement a functionality of the model elements as sequences of assembly instructions for a target processor;
a context-free grammar tool configured to describe the object code image in a context-free grammar, wherein the context-free grammar is derived directly from the macros; and
a reverse compiler tool configured to reproduce the model from the object code image and the context-free grammar, recompile the reproduced model into an executable object code image, and compare the executable object code image from the reproduced model to an executable object code image produced from an original model.

9. The system according to claim 8 wherein said macros are utilized as building blocks to fabricate the object code image of the model.

10. The system according to claim 9 wherein said forward compiler is configured to output a sequence of macro calls to implement the object code image of the model.

11. The system according to claim 9 wherein said macros are configured to output the object code image associated with a target processor.

12. The system according to claim 8 wherein to reproduce the model from the grammatical description said reverse compiler is configured to parse the object code image to reconstruct model components and their connectivity.

13. The system according to claim 8 wherein said forward compiler is configured to compile like model elements into the same sequence of instructions regardless of their location within the model.

14. The system according to claim 8 comprising a memory, said memory comprising:
a single common global data space for operation of model elements and storage of inputs and outputs associated with the model elements; and
a global constants space for all constants used within the model.

15. A method for producing executable object code from a model description, said method comprising:
converting a model description into a textual representation of model elements and interconnections between the model element;
utilizing a library of assembler macros as building blocks to generate an object code image of the model description using the macros, from the textual description, the macros including templates of object code configured to implement functionality of the model elements as sequences of assembly instructions for a target processor;
describing the object code image in a context-free grammar derived directly from the macros;
reproducing the model description from the object code image and the context-free grammar;
recompiling the reproduced model description into an executable object code image; and
comparing the executable object code image from the reproduced model description to an executable object code image produced from an original model description.

16. A method for reproducing a description for a model from an executable object code image, said method comprising:
describing the object code image in a context-free grammar;
reproducing the model description from the object code image and the context-free grammar, based on a library of assembler macros of utilized in the generation of the object code image, wherein the macros are configured to implement functionality of model elements as sequences of assembly instructions for a target processor;
recompiling the reproduced model description into an executable object code image; and
comparing the executable object code image from the reproduced model description to an executable object code image produced from an original model description.

17. The method according to claim 16 wherein reproducing the model description comprises parsing the object code image to reconstruct model components and their connectivity within the model.

* * * * *